United States Patent
Fritz

(10) Patent No.: US 9,382,035 B2
(45) Date of Patent: Jul. 5, 2016

(54) MARKET BASKET SYSTEM

(71) Applicant: Linda Fritz, Verona, KY (US)

(72) Inventor: Linda Fritz, Verona, KY (US)

(*) Notice: Subject to any disclaimer, the term of this patent is extended or adjusted under 35 U.S.C. 154(b) by 0 days.

(21) Appl. No.: 14/526,131

(22) Filed: Oct. 28, 2014

(65) Prior Publication Data

US 2015/0114959 A1     Apr. 30, 2015

Related U.S. Application Data

(60) Provisional application No. 61/896,511, filed on Oct. 28, 2013.

(51) Int. Cl.
| | |
|---|---|
| B65D 21/08 | (2006.01) |
| B65D 6/08 | (2006.01) |
| B65D 6/00 | (2006.01) |
| B65D 6/18 | (2006.01) |
| A47J 41/00 | (2006.01) |
| B62B 3/02 | (2006.01) |
| B65D 21/02 | (2006.01) |
| B65D 81/38 | (2006.01) |
| B62B 1/12 | (2006.01) |

(52) U.S. Cl.
CPC ............... *B65D 11/14* (2013.01); *A47J 41/00* (2013.01); *B62B 1/12* (2013.01); *B62B 3/027* (2013.01); *B65D 11/10* (2013.01); *B65D 11/1826* (2013.01); *B65D 11/1833* (2013.01); *B65D 21/0213* (2013.01); *B65D 81/38* (2013.01); *B62B 2202/12* (2013.01)

(58) Field of Classification Search
CPC .... B65D 11/14; B65D 11/10; B65D 11/1833; B65D 11/1826; B65D 21/0213; B65D 81/38; A47J 41/00; B62B 3/027
See application file for complete search history.

(56) References Cited

U.S. PATENT DOCUMENTS

| | | | | |
|---|---|---|---|---|
| 3,796,342 A | * | 3/1974 | Sanders | B65D 11/1826 220/1.5 |
| 4,235,331 A | * | 11/1980 | Bates, III | A45C 5/045 206/170 |
| 4,720,020 A | * | 1/1988 | Su | B65D 19/42 220/1.5 |
| 5,064,068 A | * | 11/1991 | Sheng | B65D 11/1826 206/425 |
| 7,137,522 B2 | * | 11/2006 | Dubois | B65D 11/184 206/509 |
| 7,290,663 B2 | * | 11/2007 | Deng | B65D 25/107 206/454 |
| 8,702,111 B2 | * | 4/2014 | Simoes | B62B 3/025 280/33.998 |
| 2011/0180577 A1 | * | 7/2011 | Woodward | A45C 13/30 224/411 |

* cited by examiner

*Primary Examiner* — John Walters
*Assistant Examiner* — Brian Swenson
(74) *Attorney, Agent, or Firm* — Ulmer & Berne LLP

(57) ABSTRACT

A collapsible market basket apparatus includes a crate with a bottom having a bottom rectangular frame and a top rectangular frame having strap attachment features on each of four sides. A pair of lateral rotating sides are pivotally attached to opposite lateral sides of the top rectangular frame to rotate downward to a vertical position to engage the bottom rectangular frame. Each lateral rotating side is shaped to fit within a proximate half of the top rectangular frame when pivotally rotated to a horizontal position. A pair of lateral collapsible sides are attached respectively between opposite front and back sides of the top rectangular frame and the bottom rectangular frame. The lateral collapsible sides have an expanded vertical length of the lateral rotating sides. A strap has a latching feature rotatably attached at each end to latch to opposite sides of the top rectangular frame as a carrying strap when the crate is expanded and as a stowage strap when the crate is collapsed.

12 Claims, 17 Drawing Sheets

MARKET BASKET SYSTEM

CROSS-REFERENCE TO RELATED APPLICATIONS

This application claims the benefit of priority under 35 U.S.C. §119(e) to U.S. Patent Application Provisional Application Ser. No. 61/896,511 entitled "Market Basket System", filed Oct. 28, 2013, the contents of which are hereby incorporated by reference in their entirety.

BACKGROUND OF THE INVENTION

1. Field of the Invention

The present innovation relates generally to devices and methods for use as market baskets for shopping.

2. Description of the Related Art

Traditionally, consumers filled a shopping cart provided by the retail store with groceries and sundries. Items that required refrigeration or that were fragile tended to be damaged during the time spent shopping. Once at the checkout counter, a store clerk had to handle each item to locate the label or barcode in order to record the purchase. Then each item had to be placed in a flimsy, one-use plastic bag for taking home. Moving the plastic bags back into a cart, into a vehicle, and then into the consumer's home provided numerous opportunities for further damage to refrigerated or fragile products.

Recently, awareness has grown of the economic consequences of disposable products such as plastic bags. Significant effort is expended in recycling such items, in some instances to overcome a fee or a ban associated with plastic bags. In the alternative, reusable shopping bags of a woven or non-woven fabric have become available. However, while reusable, the structural integrity of such fabric shopping bags is still limited. In addition, the fabric tends to hold bacteria and contaminants. Scrupulous cleaning of the fabric shopping bags further limits their service life. Even when new the fabric shopping bags provide limited protection to their contents. In partial answer to these shortcomings, some consumers bring rigid containers to the store. However, such containers take up a significant amount of space when being stowed.

SUMMARY OF THE INVENTION

In one aspect, the present disclosure provides a collapsible market basket apparatus includes a crate with a bottom having a bottom rectangular frame and a top rectangular frame having strap attachment features on each of four sides. A pair of lateral rotating sides are pivotally attached to opposite lateral sides of the top rectangular frame to rotate downward to a vertical position to engage the bottom rectangular frame. Each lateral rotating side is shaped to fit within a proximate portion of the top rectangular frame when pivotally rotated to a horizontal position. A pair of lateral collapsible sides that are attached respectively between opposite front and back sides of the top rectangular frame and the bottom rectangular frame. Each lateral collapsible side has an expanded vertical length that is the same as the lateral rotating sides.

In another aspect, the present disclosure provides a stowable crate-on-wheels apparatus that receives the crate when expanded and collapses to a compact satchel shape when collapsed. In one embodiment, the stowable crate-on-wheels apparatus includes a front panel, a back panel that supports a pair of wheels, folding sides attached between the front and back panels, a flip down bottom hingedly attached to a bottom edge of one of the front panel and the back panel, a pair of side stiffener components that are selectably attachable to the flip down bottom and to respective top edges of the folding sides that are expanded, and an upwardly telescoping handle that is attached to the back panel.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

The present innovation provides a Collapsible Reusable Environmentally-friendly Stackable Box Idea (CRESBI) crate and accessories that can eliminate plastic bags at checkout, help consumers protect their products, be more organized, avoid germs and bacteria problems, and speed up the checkout process. The CRESBI crate can be molded from a polymer or resin such as polypropylene to be economical, strong, and easily cleaned and disinfected. A system or apparatus that includes the CRESBI crate of various sizes can selectably include accessories such as strong custom-ornamented nylon straps, thermally insulated containers for being received inside of or around the CRESBI crate, bottle separating insertable grid, and a collapsible dolly.

In general, it is getting harder to find paper bags. Certain areas are banning or imposing a fee for use of plastic bags. Even if available, use of plastic bags can have a number of drawbacks. For example, the sheer number of plastic bags that one consumer may use in a year can average 500. By contrast, one CRESBI crate can replace six (6) plastic bags as well as avoiding the need to landfill or recycle the single use plastic bag. Single use disposable plastic bags are generally cheaply made and often fail to contain groceries or other consumer products without breaking. Even if not torn, the plastic bags do not protect their contents from damage. However, the CRESBI crate has structural integrity that can protect its contents. Moreover, the contents can be placed into the CRESBI crate with their labels or barcodes visibly presented for visual inspection or a handheld scanner so that checkout is quicker. In addition, the store clerk need not handle the contents, thus providing a more hygienic operation.

Figure 1:
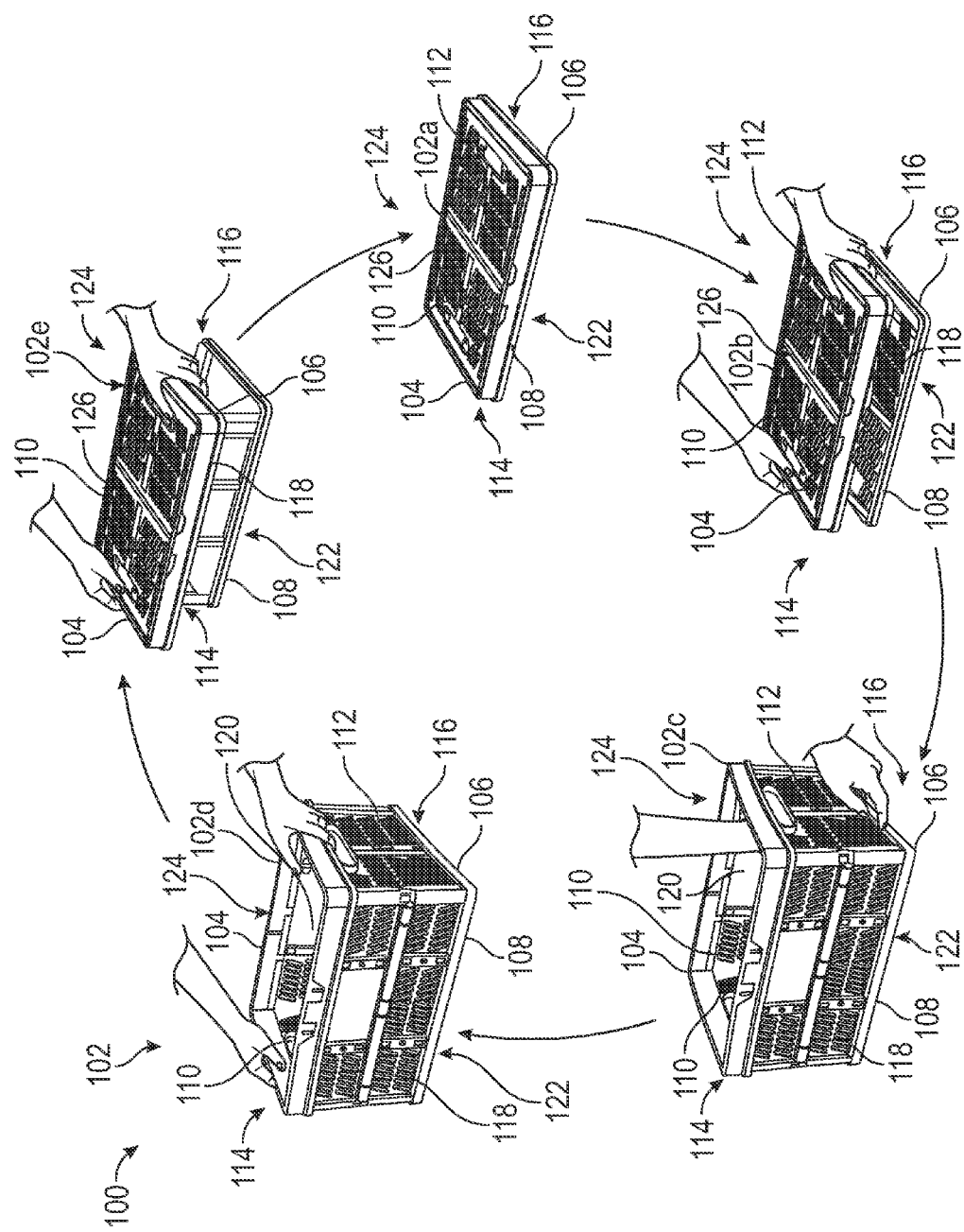
FIG. 1 illustrates a perspective view of a sequence of expanding and collapsing a Collapsible Reusable Environmentally-friendly Stackable Box Idea (CRESBI) crate, according to one or more embodiments.

FIG. 1 illustrates a collapsible market basket apparatus 100 that includes a CRESBI crate 102 that is capable of being readily collapsed for stowing or expanded for use. In a first collapsed state, a CRESBI crate 102a has its top rectangular frame 104 in contact with a bottom rectangular frame 106 of its bottom 108. A pair of lateral rotating sides 110, 112 are pivotally attached to opposite lateral sides 114, 116 of the top rectangular frame 104 and are rotated to a horizontal position. The lateral rotating sides 110, 112 are shaped to fit within a proximate half of the top rectangular frame 104, either in direct abutment with each other as depicted or partially overlapping. A pair of lateral collapsible sides 118, 120 are attached respectively between opposite front and back sides 122, 124 of the top rectangular frame 104 and the bottom rectangular frame 106. The lateral collapsible sides 118, 120 have an expanded vertical length that is the same as the lateral rotating sides 110, 112. In one embodiment, each lateral collapsible side comprises a top panel hingedly engaged to a bottom panel to collapse by accordion folding together.

For clarity, directions such as vertical, horizontal, top, bottom, right, left, front and back are used to describe the innovation with reference to the Drawings. It should be appreciated that various embodiments of the present innovation can be oriented in other manners.

FIG. 1 further illustrates the CRESBI crate 102 being expanded and collapsed. A collapsed CRESBI crate 102a has the top and bottom rectangular frames 104, 106 in close proximity. The lateral rotating sides 110, 112 are horizontal forming a top 126 along with the top rectangular frame 104. A partially expanded CRESBI crate 102b is created by lifting the top rectangular frame 104, which unfolds the lateral collapsible sides 118, 120. With the CRESBI crate 102c at full height, the lateral rotating sides 110, 112 are rotated downward to their vertical, expanded position and frictionally engaged to the lateral collapsible sides 118, 120 and bottom rectangular frame 106. After use, the CRESBI crate 102d is unlocked for collapsing and stowing by inwardly rotating the lateral rotating sides 110, 112, thereby disengaged from the lateral collapsible sides 118, 120 and bottom rectangular frame 106 and toward their horizontal collapsed position. With the top 126 formed by the lateral rotating sides 110, 112 and the top rectangular frame 104, CRESBI crate 102e can be pushed forward and rocked back to settle the lateral collapsible sides 118, 120 toward complete collapsed position of the collapsed CRESBI crate 102a.

Figure 2:
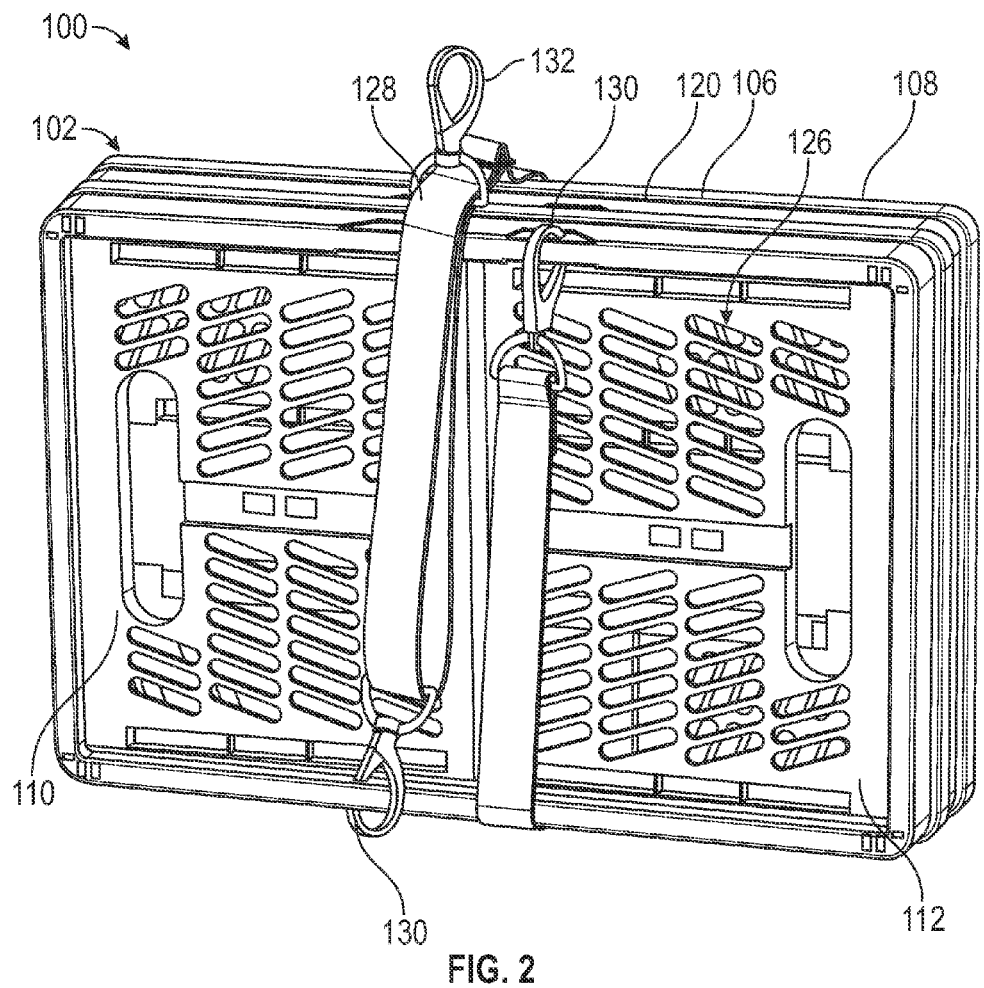
FIG. 2 illustrates a perspective top view of the collapsed CRESBI crate of FIG. 1 with a strap, according to one or more embodiments.
Figure 2A:
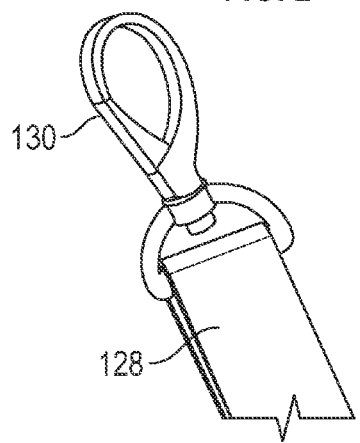
FIG. 2A illustrates a side view of a strap with swivel hook of the collapsed CRESBI crate of FIG. 2, according to one or more embodiments.

FIG. 2 illustrates the collapsed CRESBI crate 102a with a strap 128 having a latching feature such as swivel clips 130 at each end to latch to opposite sides of the top rectangular frame as a carrying strap when the crate is expanded or as a stowage strap when the crate is collapsed as depicted. The strap 128 further can includes a middle latch 132 to attach to a shopping cart (not shown) for carrying the collapsed CRESBI crate 102a until needed.

Figure 3:
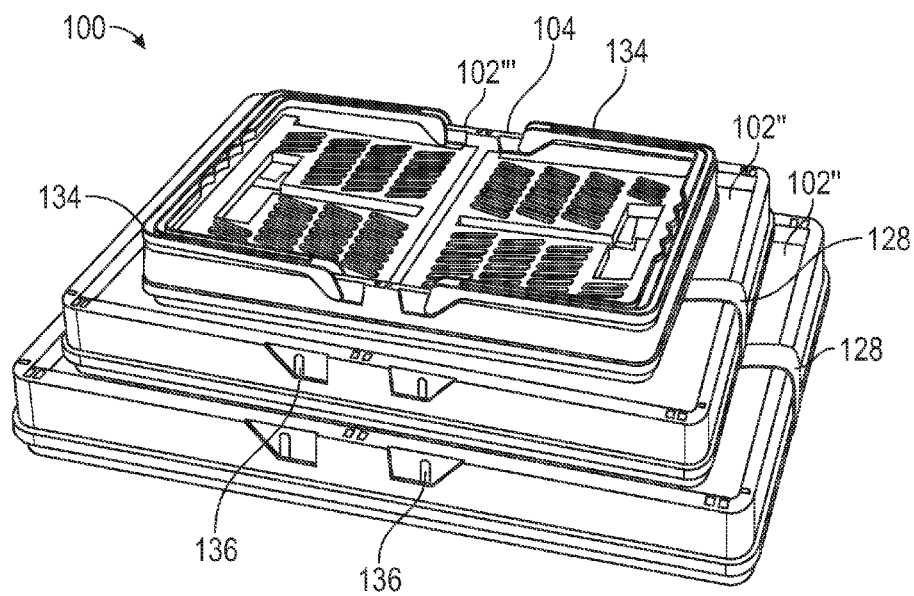
FIG. 3 illustrates a nested stack of three CRESBI crates each in collapsed state and of a different size, according to one or more embodiments.
Figure 4:
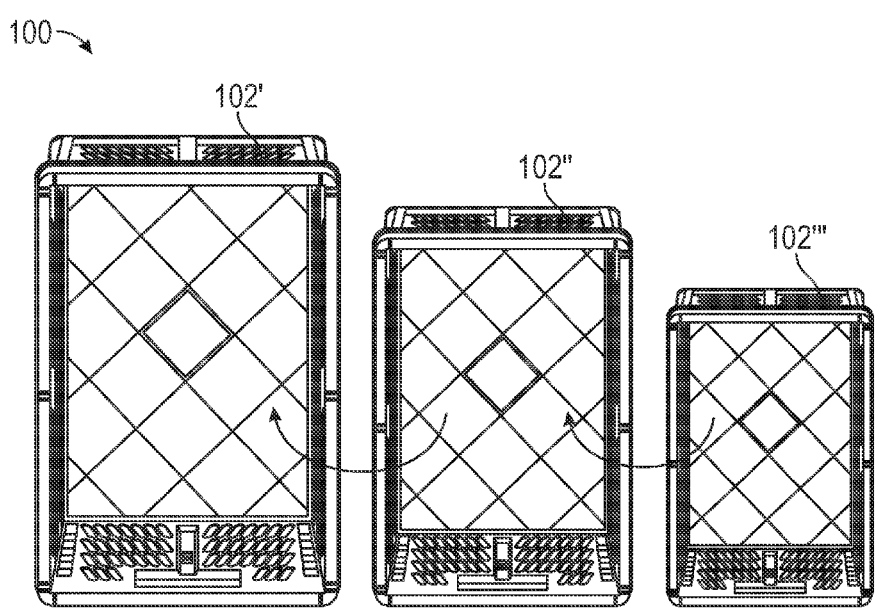
FIG. 4 illustrates a top view of the three CRESBI crates of FIG. 3 each in an expanded state for being internally nested, according to one or more embodiments.

In one embodiment, FIGS. 3-4 illustrates a collapsible market basket apparatus 100 wherein CRESBI crates 102', 102", 102'" are of a variety of sizes such as three sizes: large (18"×13"×10.1"), medium (15.3"×10.3"×8.3"), and small (12"×8"×6.5"), respectively. The sizes can suit particular types of goods, particular sizes of shopping carts, or personal preferences and capabilities for lifting the CRESBI crates 102', 102", 102'". In addition, in some instances, the CRESBI crates 102', 102", 102'" can be nested together in either the expanded (FIG. 4) or collapsed states (FIG. 3). FIG. 3 also illustrates detachable rigid handles 134 engaged to the top rectangular frame 104 of the CRESBI crates 102'". Handle apertures 136 are exposed on the CRESBI crates 102', 102" that could be used for similar detachable rigid handles 134 (not shown) of appropriate size instead of straps 128.

The CRESBI crates 102', 102", 102'" can be made from molded or extruded polymer or resin, such as polypropylene. The material selected can withstand general use disinfectants and hot water, such as diluted bleach. The CRESBI crates 102', 102", 102'" can also be washed in a dishwasher.

Figure 5:
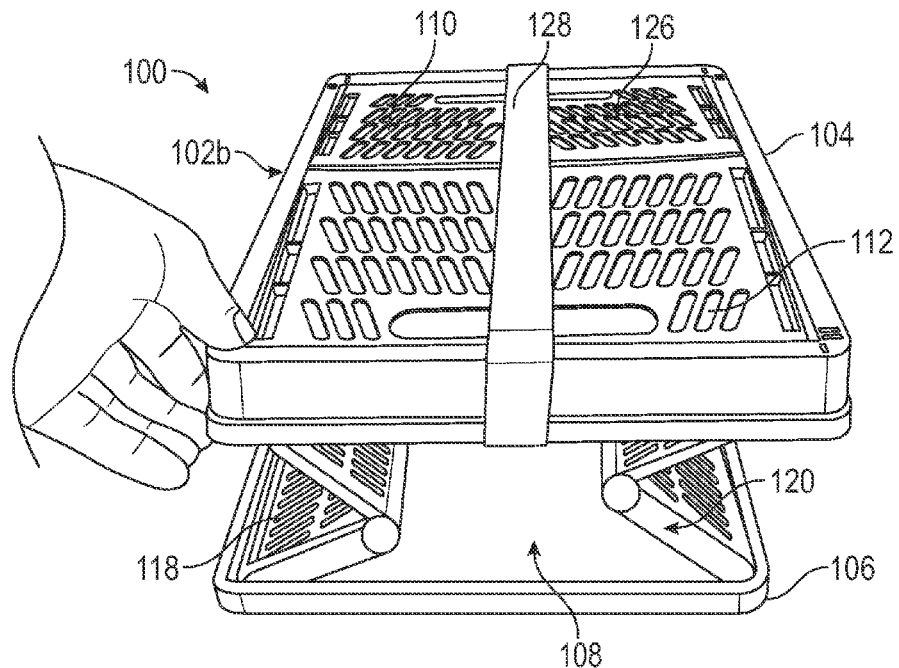
FIG. 5 illustrates a perspective view the partially expanded CRESBI crate of FIG. 1 with a top being positioned upward to unfold lateral collapsible sides, according to one or more embodiments.

FIG. 5 illustrates the partially expanded CRESBI crate 102b with the top 126 being positioned upward to unfold the lateral collapsible sides 118, 120 or being rocked back and forth to fully fold the lateral collapsible sides 118, 120.

Figure 6:
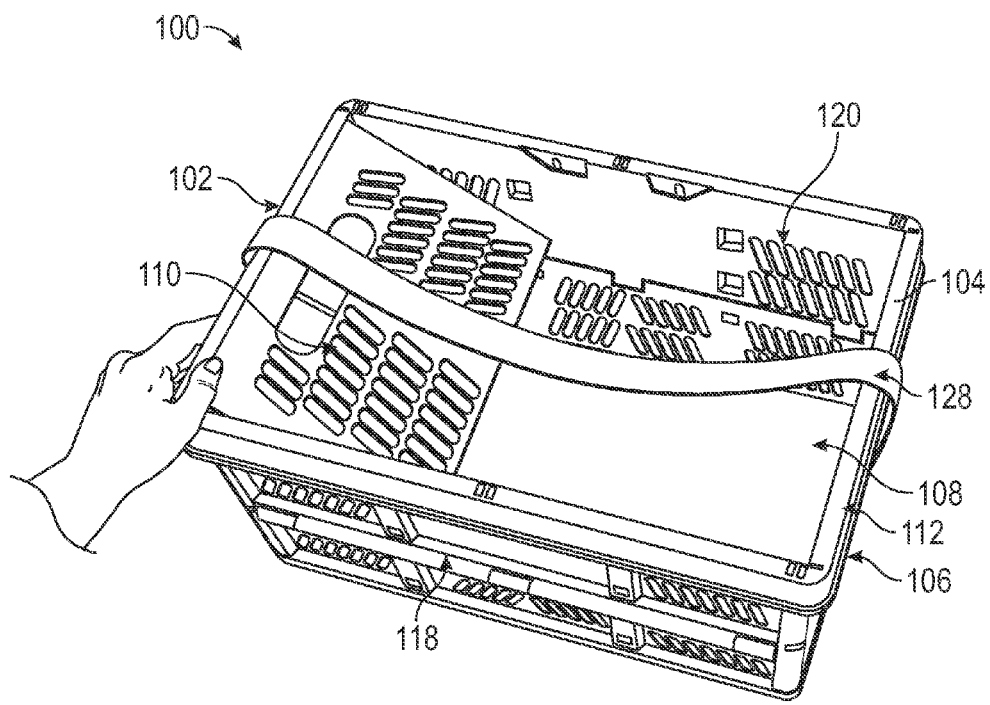
FIG. 6 illustrates a perspective view the fully expanded CRESBI crate of FIG. 1 with the lateral collapsible sides fully unfolded, according to one or more embodiments.

FIG. 6 illustrates the fully expanded CRESBI crate 102c with the lateral collapsible sides 118, 120 fully unfolded. One lateral rotating side 110 is partially moved between the collapsed and expanded state and the other lateral rotating side 112 is engaged to the lateral collapsible sides 118, 120 and bottom rectangular frame 106.

Figure 7:
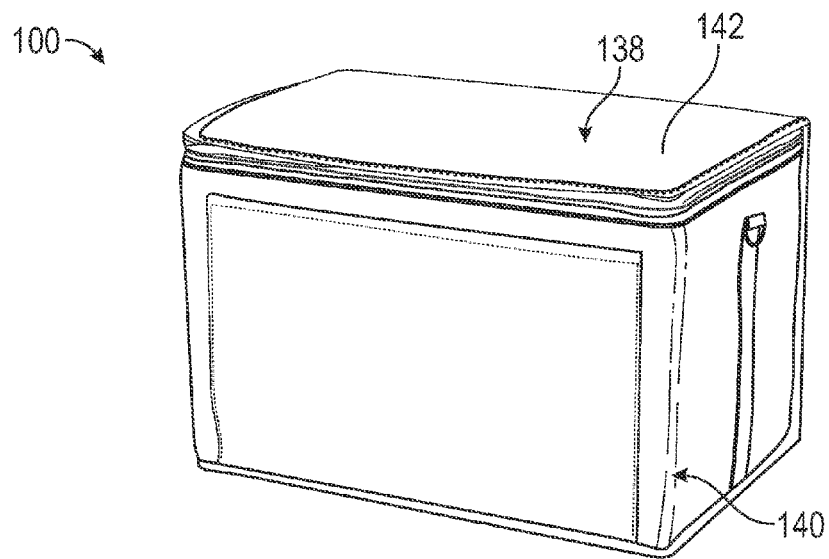
FIG. 7 illustrates a perspective view of a thermally insulated pouch, according to one or more embodiments.

FIG. 7 illustrates the collapsible market basket apparatus 100 including a thermally insulated pouch 138 that is sized for being received within, or to closely encompass, one of the CRESBI crates 102', 102", 102'" (FIG. 3-4). The thermally insulated pouch 138 can protect warm or cold products during shopping and transport. The thermally insulated pouch 138 can also provide a liquid barrier to prevent spoilage of other products carried in an underlying CRESBI crate (not shown). In one embodiment, the thermally insulated pouch 138 has a rectoid-shaped body 140 that can readily collapse for stowing and has a zippered lid 142.

Figure 8:
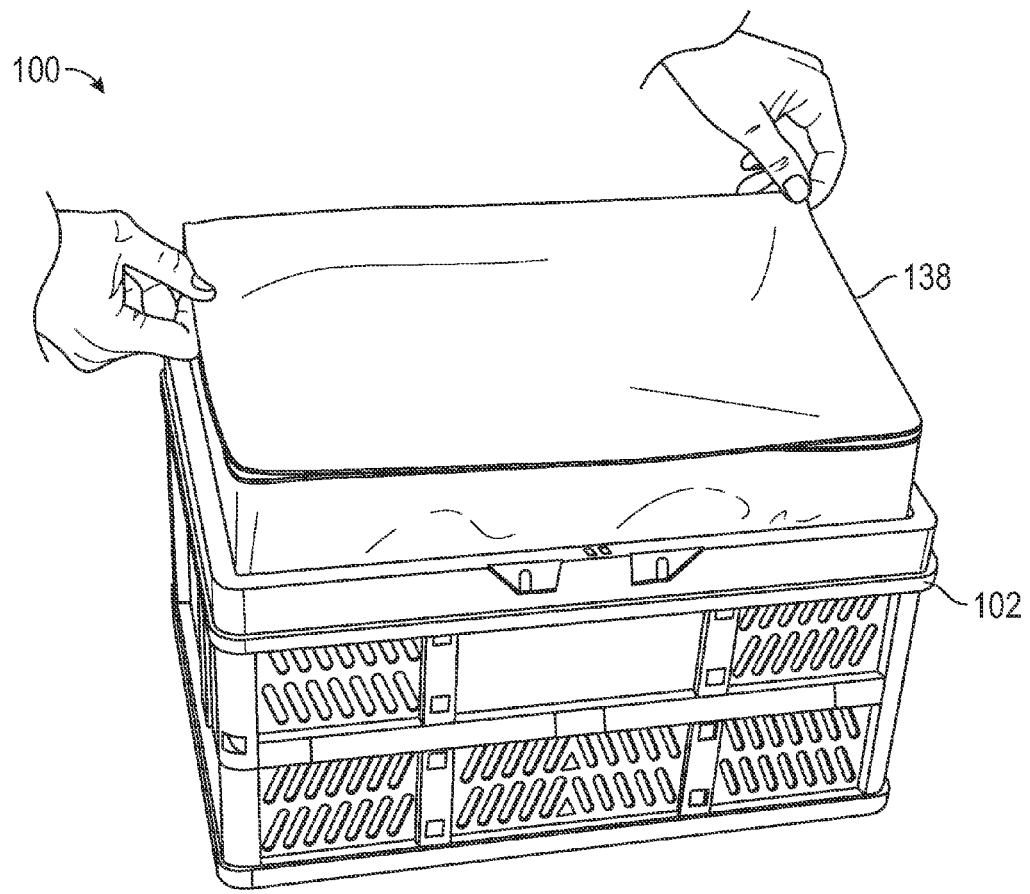
FIG. 8 illustrates a perspective view of the thermally insulated pouch of FIG. 7 partially inserted into the CRESBI crate of FIG. 1, according to one or more embodiments.
Figure 9:
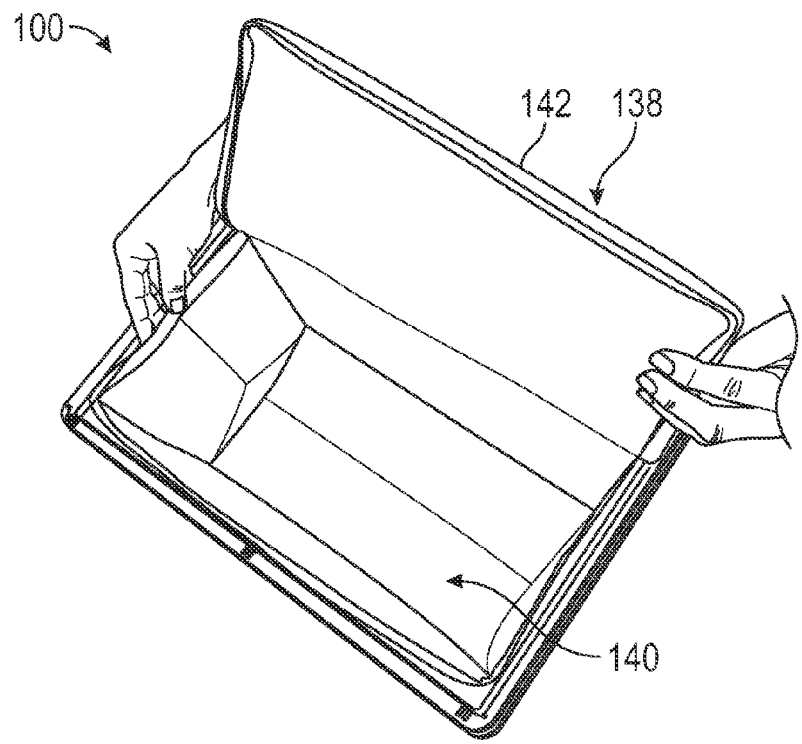
FIG. 9 illustrates a perspective view of the thermally insulated pouch of FIG. 7 fully inserted into the CRESBI crate of FIG. 8, according to one or more embodiments.
Figure 10:
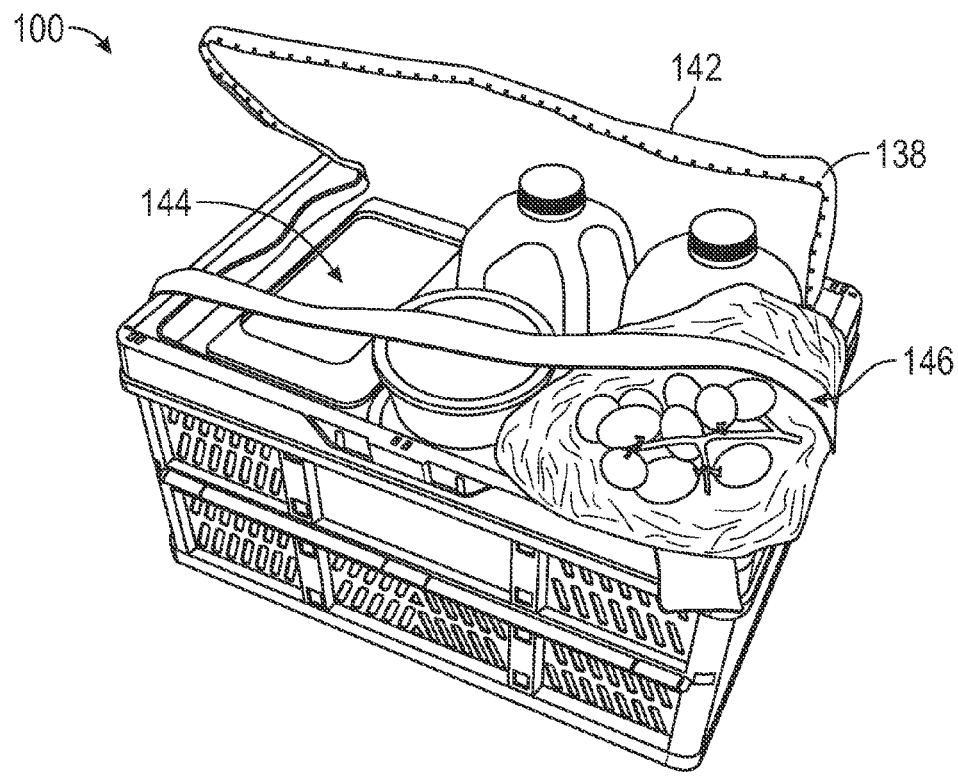
FIG. 10 illustrates a perspective view of the thermally insulated pouch of FIG. 7 fully inserted into the CRESBI crate of FIG. 8 and filled with refrigerated goods, according to one or more embodiments.

FIG. 8 illustrates the thermally insulated pouch 138 being inserted into a CRESBI crate 102. FIG. 9 illustrates the thermally insulated pouch 138 with the zippered lid 142 open after having been placed in the CRESBI crate 102. FIG. 10 illustrates the thermally insulated pouch 138 filled with refrigerated items 144 after having been placed in the CRESBI crate 102. A reusable produce netting 146 is also employed.

Figure 11:
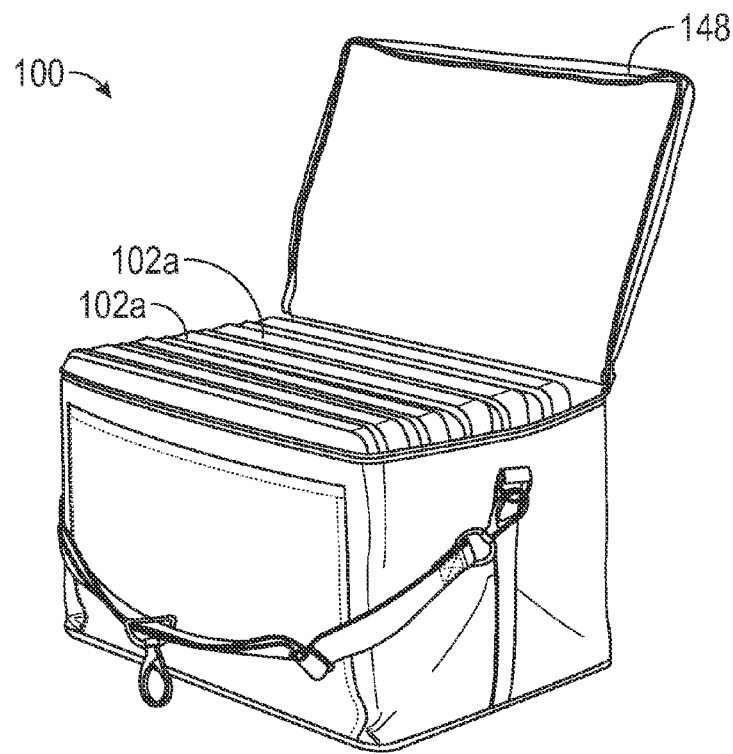
FIG. 11 illustrates a perspective view of a large sealable carrying case for carrying collapsed CRESBI crates 102a, according to one or more embodiments.
Figure 12:
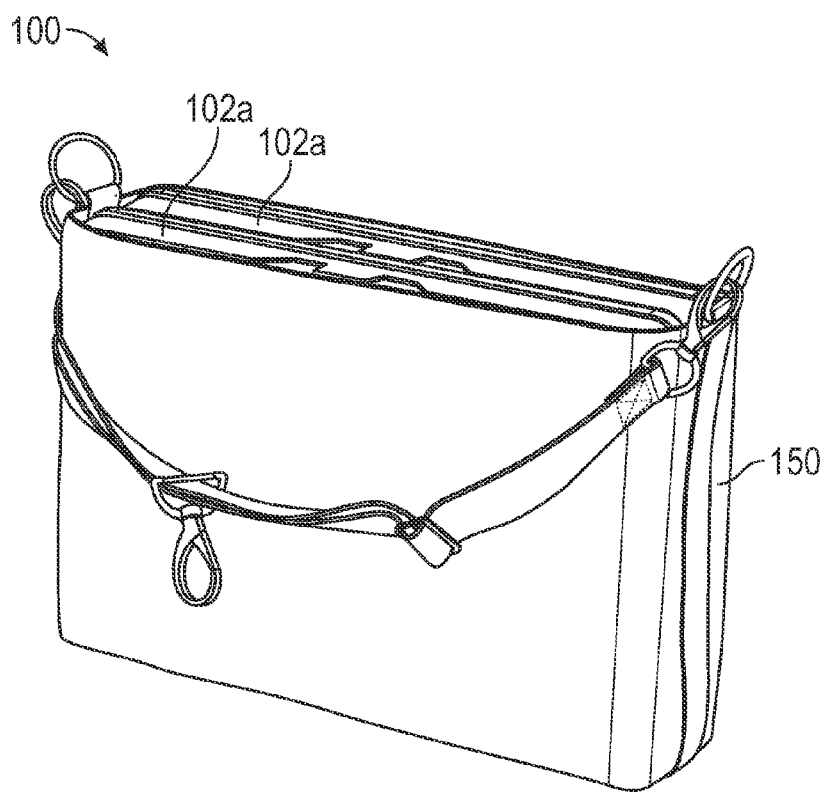
FIG. 12 illustrates a perspective view of a small carrying satchel for carrying a pair of CRESBI crates 102a, according to one or more embodiments.

FIG. 11 illustrates a large sealable carrying case 148 for carrying collapsed CRESBI crates 102a. FIG. 12 illustrates a small carrying satchel 150 for carrying a pair of CRESBI crates 102a.

Figure 13:
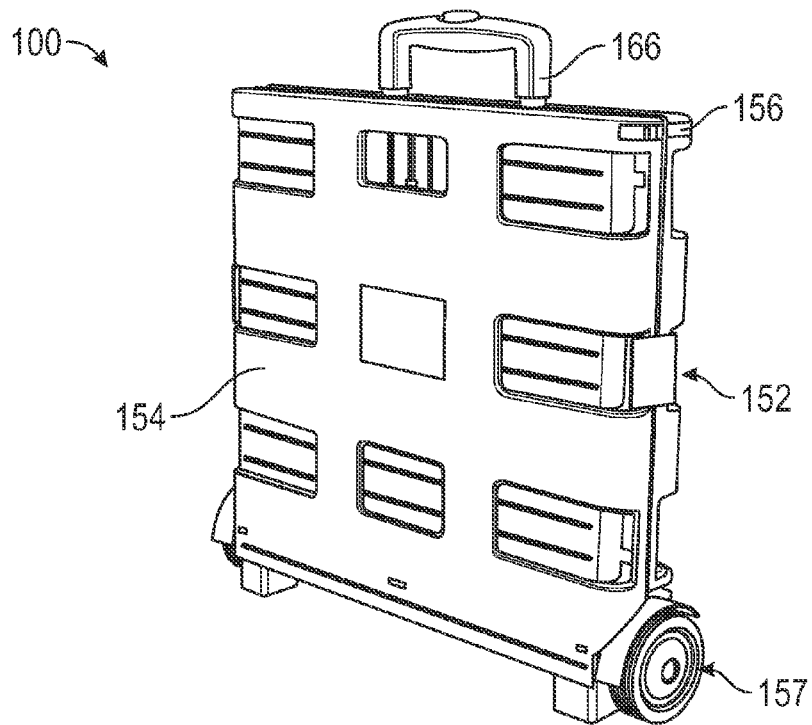
FIG. 13 illustrates a front left perspective view of a stowable crate-on-wheels apparatus in a collapsed state, according to one or more embodiments.

FIGS. 13-18 illustrate the collapsible market basket apparatus 100 further including a stowable crate-on-wheels apparatus 152 that receives the CRESBI crate 102 (FIG. 18) when the crate-on-wheels apparatus 152 is expanded. The crate-on-wheels apparatus 152 can also be collapsed to a compact satchel shape (FIG. 13). The stowable crate-on-wheels apparatus 152 includes a front panel 154, a back panel 156 that supports a pair of wheels 157, left and right folding sides 158, 160 attached between the front and back panels 154, 156. In turn, each of the left and right folding sides 158, 160 include a front lateral panel 162 and a back lateral panel 164 that are vertically pivoting attached to each other. Each front lateral panel 162 is also vertically pivotally attached to a respective lateral side of the front panel 154. Each back lateral panel 164 is also vertically pivotally attached to a respective lateral side of the back panel 156. An upwardly telescoping handle 166 is attached to the back panel 156.

Figure 14:
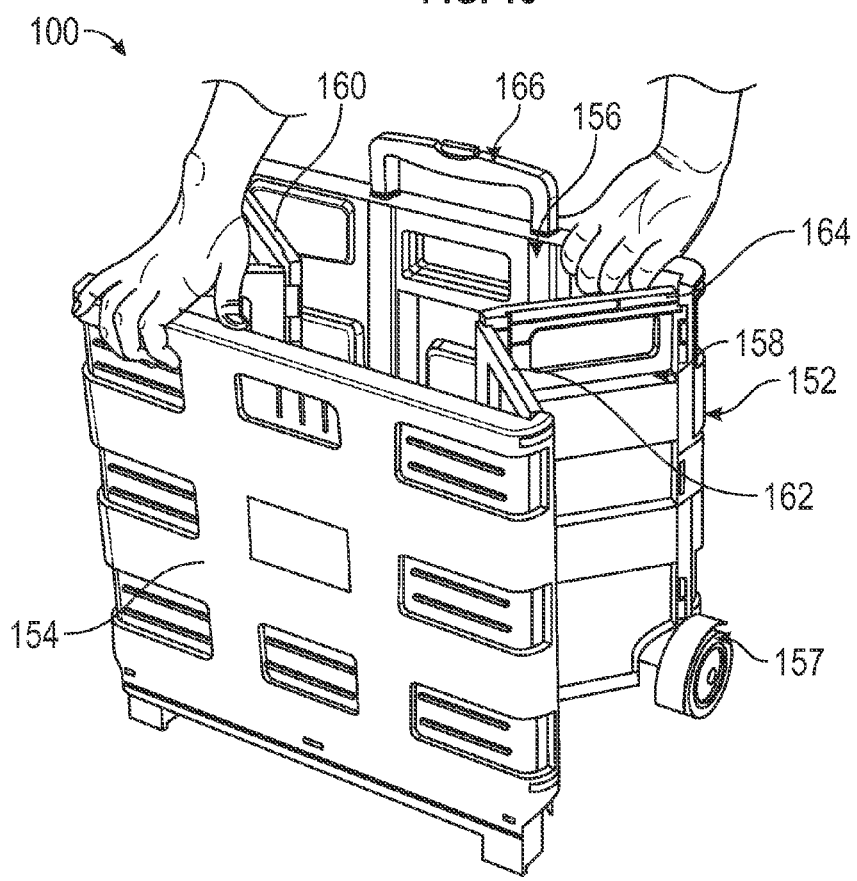
FIG. 14 illustrates a front left perspective view of front and back panels of the stowable crate-on-wheels apparatus of FIG. 13 being pulled apart to unfold, according to one or more embodiments.
Figure 15:
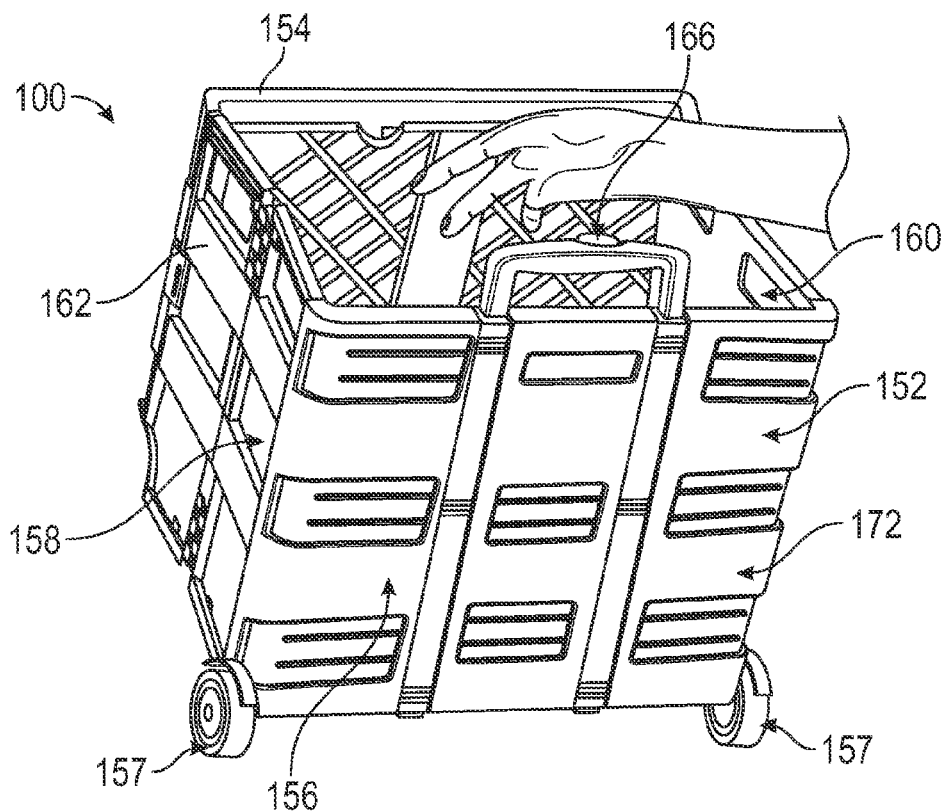
FIG. 15 illustrates a back perspective view of the stowable crate-on-wheels apparatus of FIG. 13 having a flip down bottom 168 lowered into place, according to one or more embodiments.
Figure 16:
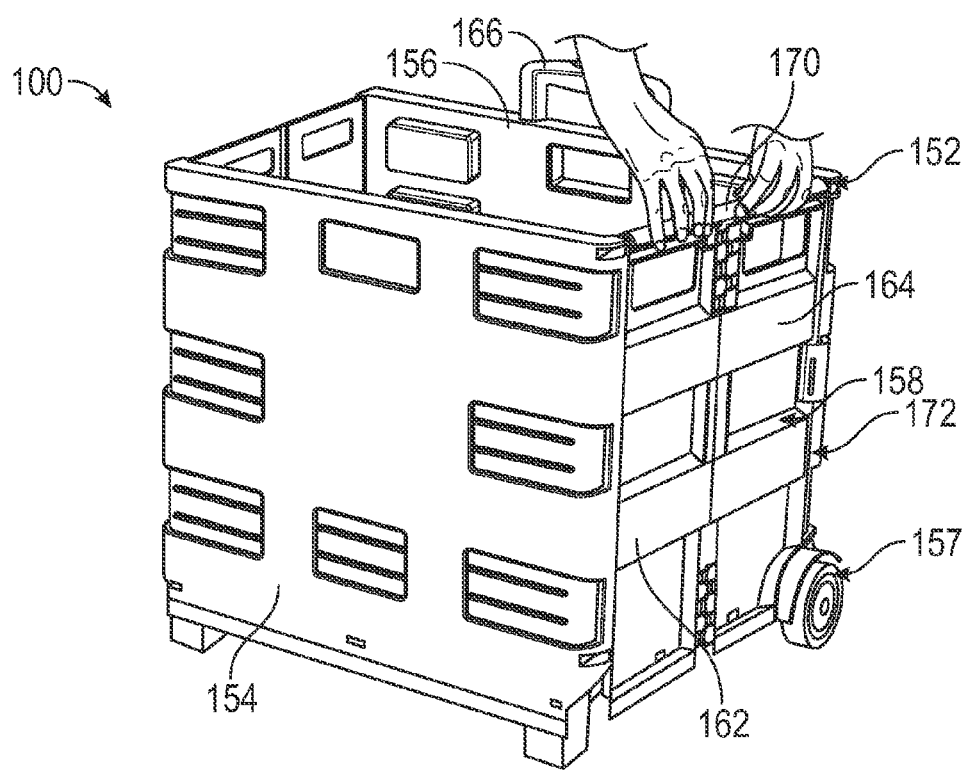
FIG. 16 illustrates a front left perspective view of the stowable crate-on-wheels apparatus of FIG. 13 having two side stiffener components installed, according to one or more embodiments.
Figure 17:
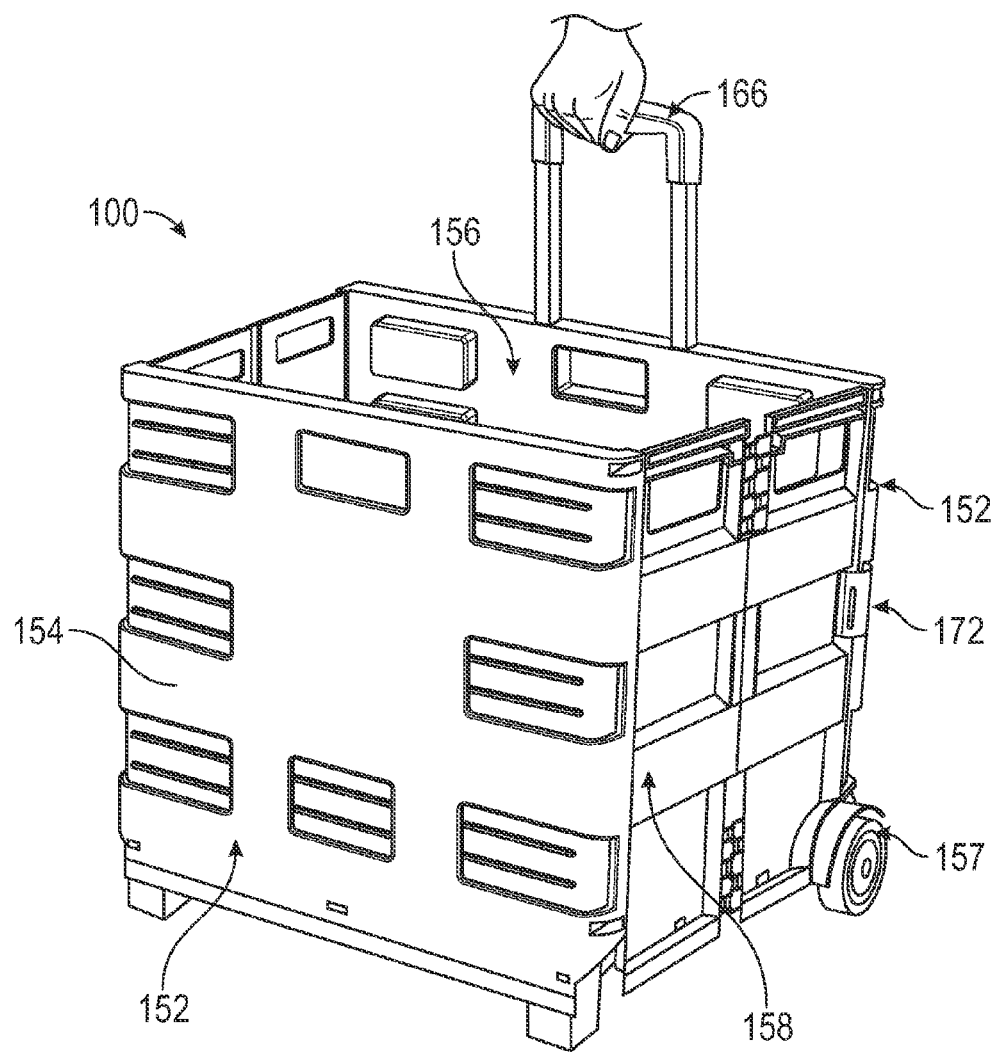
FIG. 17 illustrates a front left perspective view of the stowable crate-on-wheels apparatus of FIG. 13 ready for use with a telescoping handle extended, according to one or more embodiments.
Figure 18:
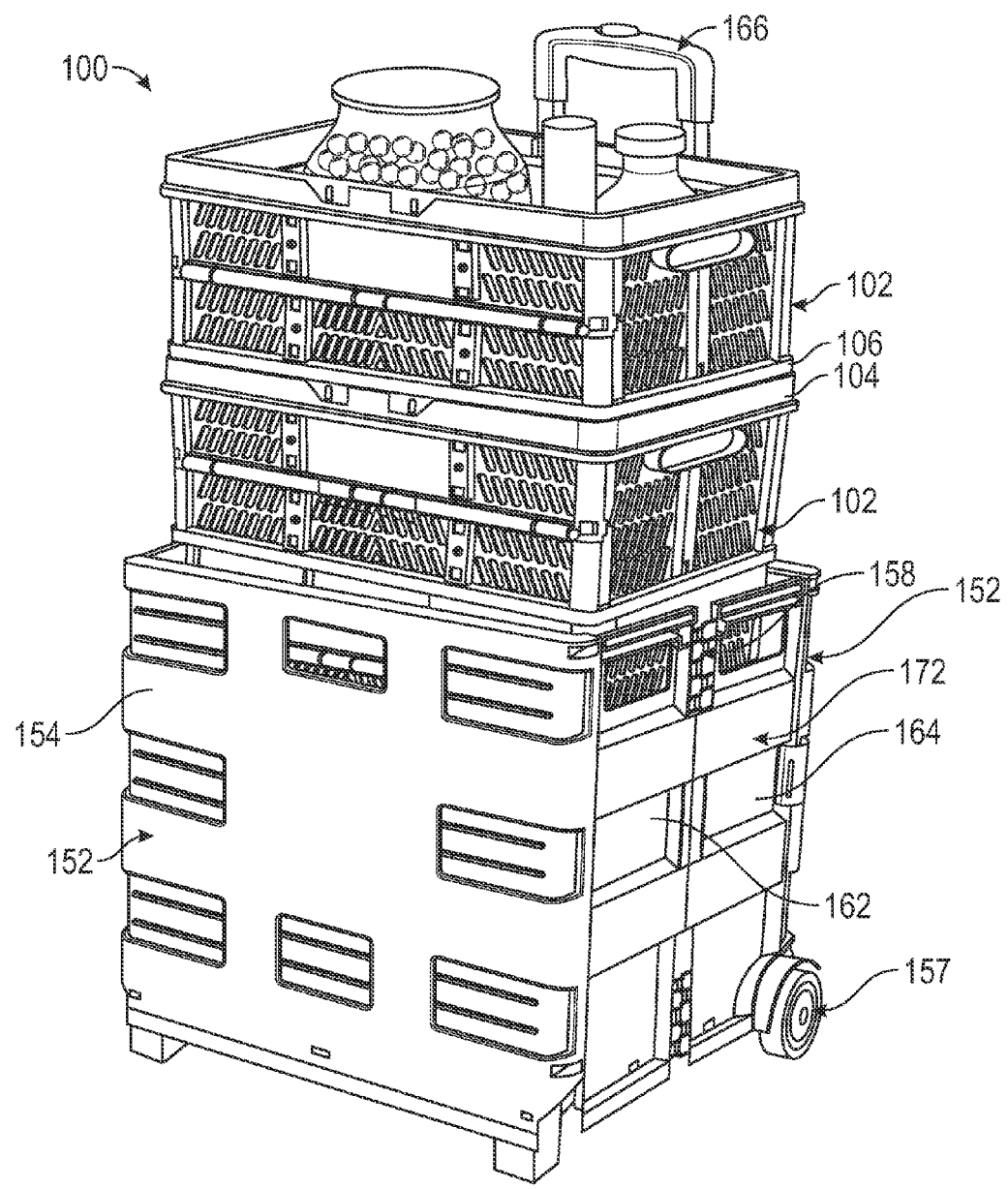
FIG. 18 illustrates a front left perspective view of the stowable crate-on-wheels apparatus of FIG. 13 carrying a stack of CRESBI crates, according to one or more embodiments.

FIG. 13 illustrates the stowable crate-on-wheels apparatus 152 in a collapsed state. FIG. 14 illustrates the front and back panels 154, 156 of the stowable crate-on-wheels apparatus 152 being pulled apart, causing the left and right folding sides 158, 160 to unfold. FIG. 15 illustrates a flip down bottom 168 hingedly attached to a bottom edge of the front panel 154. Alternatively, the flip down bottom 168 can be hingedly attached to the back panel 156 (not shown). FIG. 16 two side stiffener components 170 are respectively attached to top edges of the left and right folding sides 158, 160 to maintain a crate portion 172 in an expanded state. In one embodiment, side stiffener components 170 are detachably provisioned within recesses on a top surface of the flip down bottom 168 when not in use. FIG. 17 illustrates the stowable crate-on-wheels apparatus 152 ready for use with the telescoping handle 166 extended. FIG. 18 illustrates the stowable crate-on-wheels apparatus 152 carrying a stack of CRESBI crates 102. A top surface of the top rectangular frame 104 of an underlying CRESBI crate 102 engages a bottom surface of a bottom rectangular frame 106 of another CRESBI crate 102 that is stacked on top.

Figure 19:
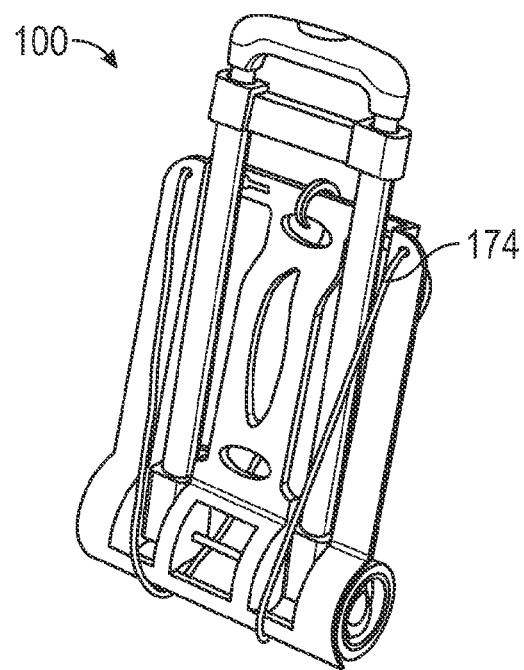
FIG. 19 illustrates a left front perspective view of a foldable dolly in a folded state, according to one or more embodiments.
Figure 20:
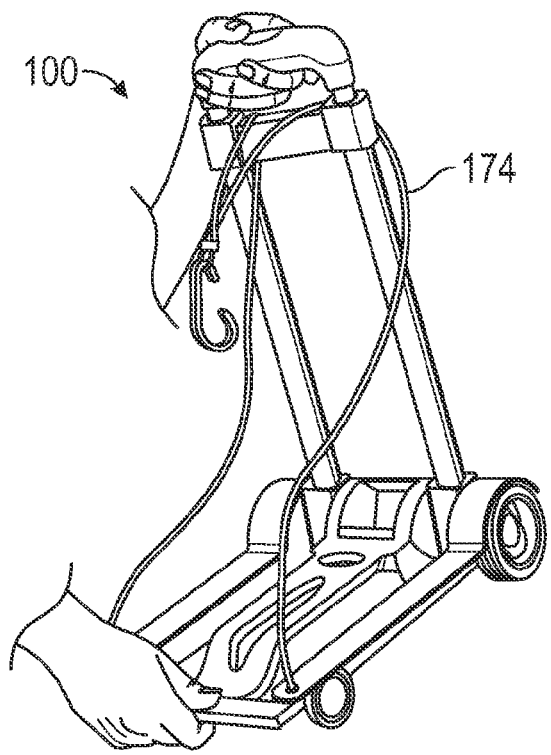
FIG. 20 illustrates a left front perspective view of the foldable dolly of FIG. 19 in an unfolded state, according to one or more embodiments.
Figure 21:
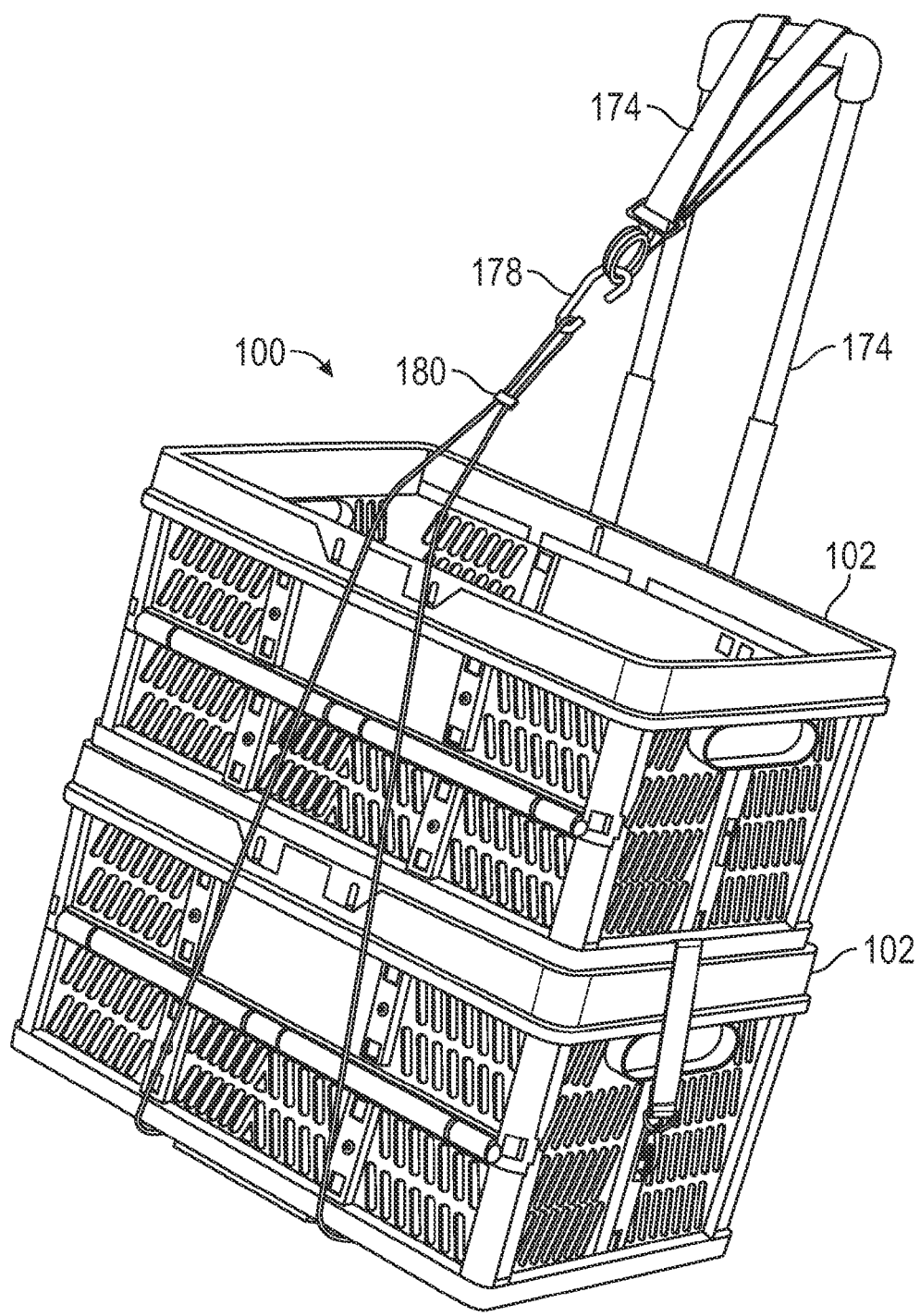
FIG. 21 illustrates a left front perspective view of the foldable dolly of FIG. 20 carrying two stacked CRESBI crates, according to one or more embodiments.

FIGS. 19-21 illustrate the collapsible market basket apparatus 100 further including a foldable dolly 174 for carrying CRESBI crates 102 (FIG. 21). FIG. 19 illustrates the foldable dolly 174 in a folded state. FIG. 20 illustrates the foldable dolly 174 in an unfolded state. FIG. 21 illustrates the foldable dolly 174 in an unfolded state carrying two stacked CRESBI crates 102 that are held on by a top hooked harness 176 that engages a single hook 178 that is attached to two diverging of bungee lines 180.

Figure 22:
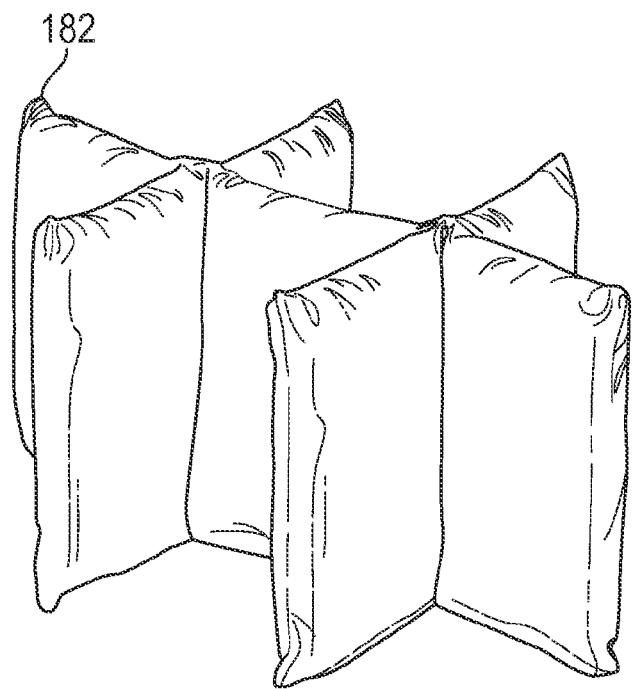
FIG. 22 illustrates left front perspective view of a padded grid, according to one or more embodiments.
Figure 23:
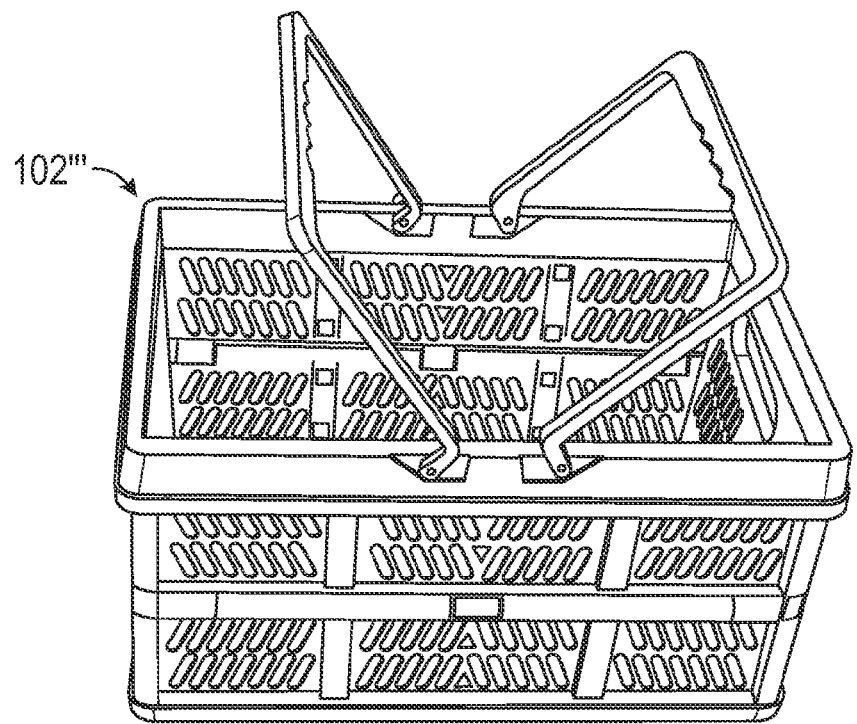
FIG. 23 illustrates a left front perspective view of the CRESBI crate of FIG. 3, according to one or more embodiments.
Figure 24:
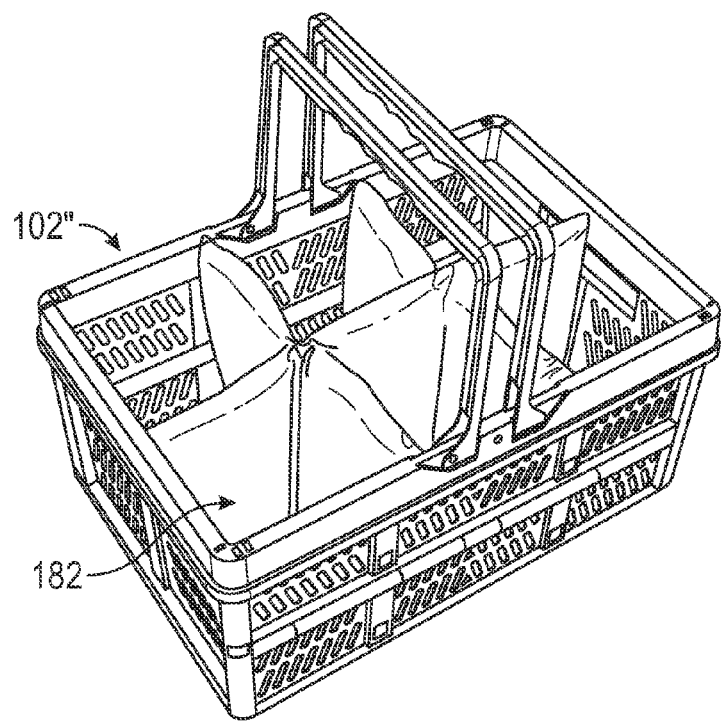
FIG. 24 illustrates a left front perspective view of the padded grid of FIG. 22 inserted into the CRESBI crate of FIG. 23 to separate an interior into compartments for glass bottles, according to one or more embodiments.

FIG. 22 illustrates a padded grid 182. FIG. 23 illustrates the CRESBI crate 102'". FIG. 24 illustrates the padded grid 182 inserted into the CRESBI crate 102'" to separate an interior into compartments for glass bottles.

Figure 25:
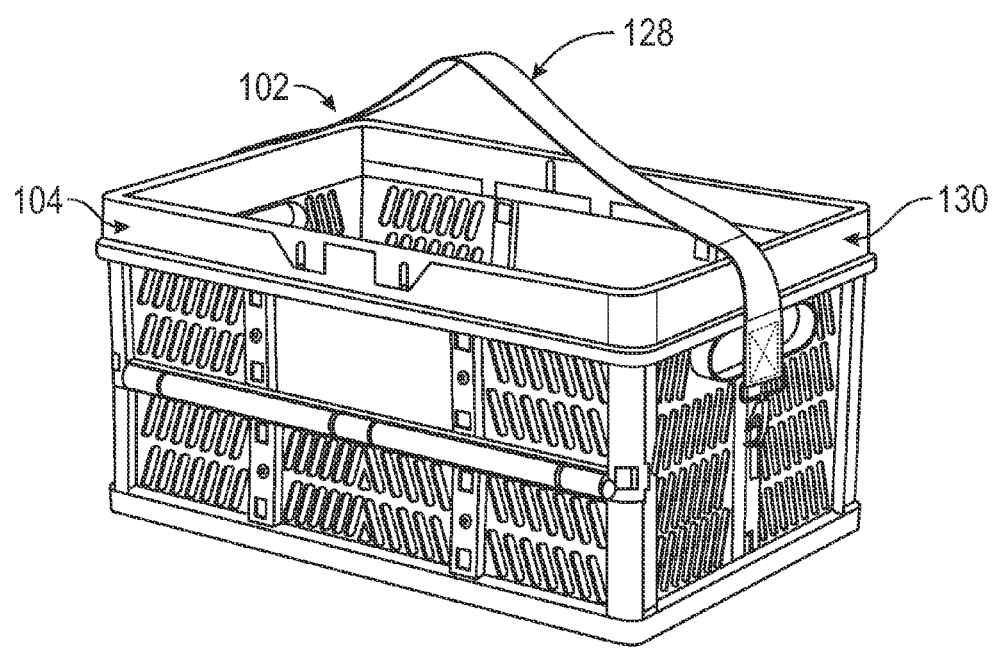
FIG. 25 illustrates a perspective view of the CRESBI crate of FIG. 1 with a strap lengthwise attached, according to one or more embodiments.

FIG. 25 illustrates the CRESBI crate 102 with a strap 128 lengthwise attached, according to one or more embodiments. The swivel hooks 130 are attached to apertures in the shorter sides of the top rectangular frame 104.

Figure 26:
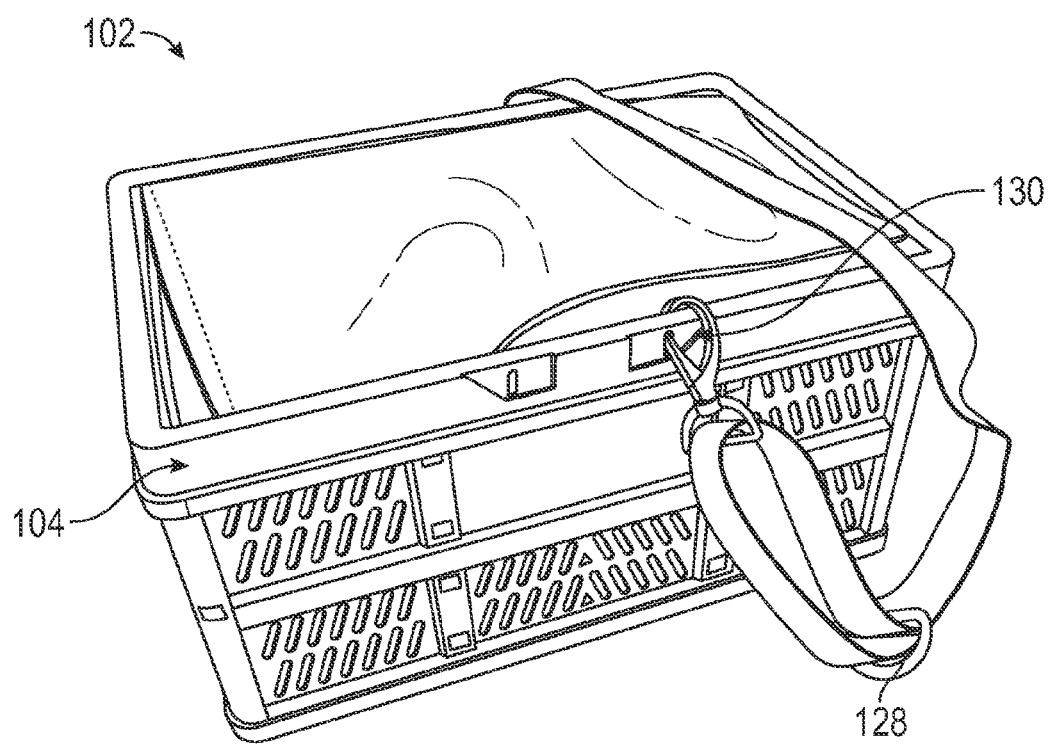
FIG. 26 illustrates a perspective view of the CRESBI crate of FIG. 1 with a strap widthwise attached, according to one or more embodiments.
Figure 27:
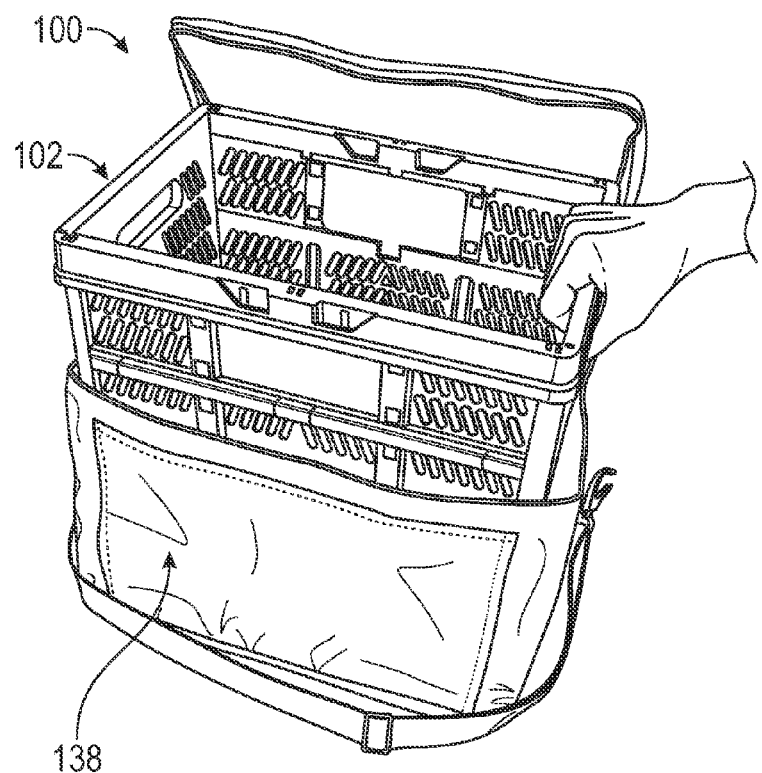
FIG. 27 illustrates a perspective view of the CRESBI crate of FIG. 1 closely received by a thermally insulated pouch, according to one or more embodiments.

FIG. 26 illustrates the CRESBI crate 102 with a strap 128 widthwise attached across the longer sides of the top rectangular frame 104, according to one or more embodiments;

FIG. 27 illustrates the CRESBI crate of 102 closely received by a thermally insulated pouch 138, according to one or more embodiments.

Figure 28:
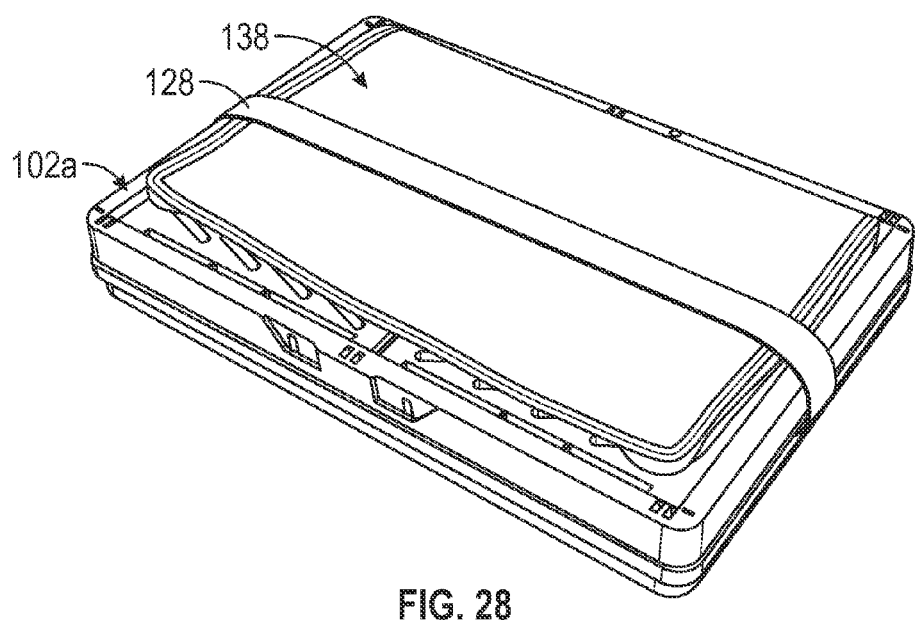
FIG. 28 illustrates a collapsed CRESBI crate and insulated pouch constrained by the strap, according to one or more embodiments.

FIG. 28 illustrates a collapsed CRESBI crate 102a and insulated pouch 138 constrained by the strap 128, according to one or more embodiments.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A collapsible market basket apparatus comprising:
    (a) a crate comprising:
        (i) a bottom having a bottom rectangular frame;
        (ii) a top having a top rectangular frame having first strap attachment features, the first strap attachment features being apertures defined by the top rectangular frame, wherein the top rectangular frame is in close proximity to the bottom rectangular frame in a collapsed position and is spaced apart from bottom rectangular frame in an expanded position suitable for carrying articles;
        (iii) a pair of lateral rotating sides that are pivotally attached to opposite lateral sides of the top rectangular frame to rotate downward from a substantially horizontal position in the collapsed position to a substantially vertical position to engage the bottom rectangular frame in the expanded position, wherein each of the lateral rotating sides includes a second strap attachment feature; and
        (iv) a pair of lateral collapsible sides that are attached respectively between opposite front and back sides of the top rectangular frame and the bottom rectangular frame, wherein each lateral collapsible side comprises a top panel hingedly engaged to a bottom panel and collapsible inward in an accordion manner in the collapsed position; and
    (b) an adjustable strap having:
        (i) a latching feature rotatably attached at each end of the adjustable strap, wherein the latching features of the strap comprise swivel snap hooks that selectively engage the first strap attachment features or the second strap attachment features, wherein the latching features engage the second strap attachment features in the collapsed position such that lifting the adjustable strap causes the lateral sides to pivot generally outward such that the crate is urged from the collapsed position to the expanded position; and
        (ii) an adjustment buckle, wherein the adjustment buckle facilitates the transition of the strap from a first length suitable for hand carrying and a second length suitable for shoulder carrying;
        (iii) a first storage position in which the adjustable strap is coupled with the first strap attachment features and is wrapped substantially around the width of the crate when the crate is in the collapsed position; and
        (iv) a second storage position in which the adjustable strap is coupled with the second strap attachment features and extends substantially along the length of the crate when the crate is in the collapsed position; and
    (c) a selectively removable thermally insulated pouch that is sized to be closely received within the crate, wherein the thermally insulated pouch is secured by the adjustable strap in the first storage position and the second storage position when the crate is in the collapsed position.

2. The collapsible market basket apparatus of claim 1, wherein the crate is constructed from a polymer.

3. The collapsible market basket apparatus of claim 1, wherein the crate is constructed from polypropylene.

4. The collapsible market basket apparatus of claim 1, wherein the crate is constructed from resin.

5. The collapsible market basket apparatus of claim 1, further comprising a bottle separating insertable grid.

6. The collapsible market basket apparatus of claim 1, wherein the crate has dimensions including a length of 18 inches, a width of 13 inches, and a height of 10.1 inches.

7. The collapsible market basked apparatus of claim 1, wherein the crate has dimensions including a length of 15.3 inches, a width of 10.3 inches, and a height of 8.3 inches.

8. The collapsible market basket apparatus of claim 1, wherein the crate has dimensions including a length of 12 inches, a width of 8 inches, and a height of 6.5 inches.

9. The collapsible market basket apparatus of claim 1, wherein the selectively removable thermally insulated pouch has a substantially rectoid shape.

10. The collapsible market basket apparatus of claim 1, wherein the selectively removable thermally insulated pouch is collapsible for storage.

11. The collapsible market basket apparatus of claim 1, wherein the selectively removable thermally insulated pouch includes a zippered lid.

12. The collapsible market based apparatus of claim 1, wherein the crate is stacked with a plurality of additional crates for storage or transportation.

* * * * *